(No Model.)

R. FRICK & O. J. ROWE.
HAY RAKE.

No. 318,459. Patented May 26, 1885.

WITNESSES
C. W. Dashiell,
E. G. Siggers.

Rudy Frick.
Oliver J. Rowe.
INVENTORS

By C. A. Snow & Co.
Attorneys

UNITED STATES PATENT OFFICE.

RUDY FRICK AND OLIVER J. ROWE, OF HARRISVILLE, INDIANA.

HAY-RAKE.

SPECIFICATION forming part of Letters Patent No. 318,459, dated May 26, 1885.

Application filed May 16, 1884. (No model.)

*To all whom it may concern:*

Be it known that we, RUDY FRICK and OLIVER J. ROWE, citizens of the United States, residing at Harrisville, in the county of Randolph and State of Indiana, have invented a new and useful Improvement in Hay-Rakes, of which the following is a specification, reference being had to the accompanying drawings.

Our invention relates to a combined hay and stalk rake; and it has for its object to provide a device of this character which shall be cheap and simple in its construction and effective and durable in its use.

The invention consists in the improved construction and combinations of parts hereinafter fully described, and pointed out in the claims.

Figure 1:
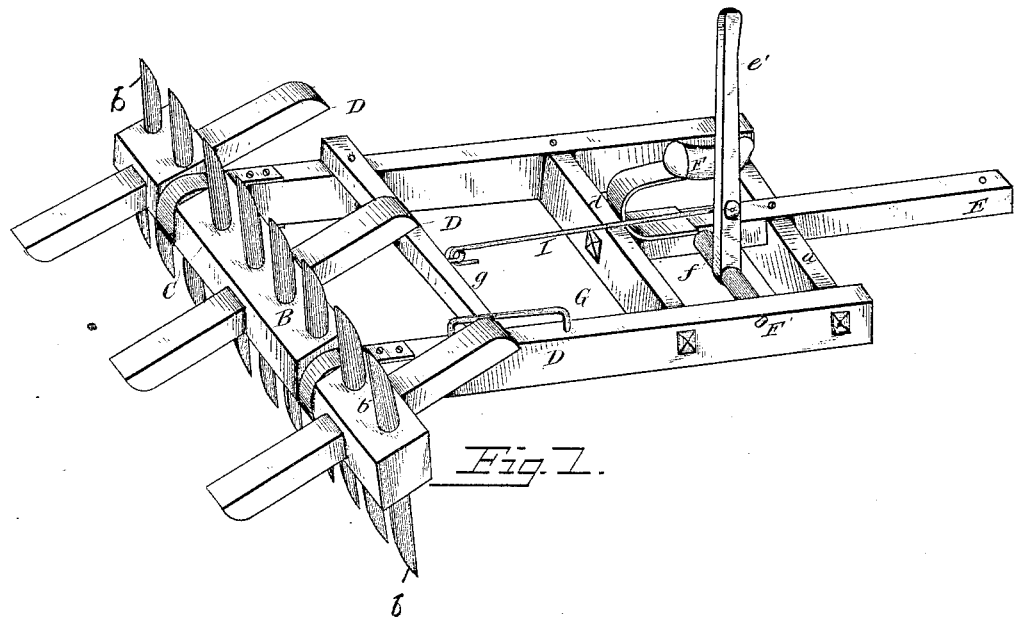
Figure 2:
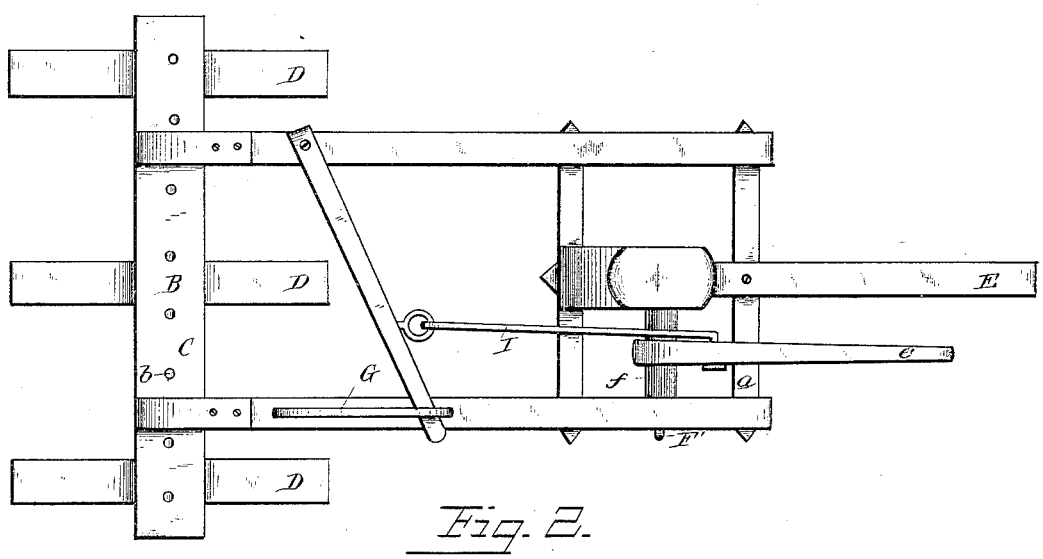

In the drawings, Figure 1 is a perspective view showing the rake rigidly held against any revolution. Fig. 2 is a plan view showing the lever disengaged from the stop-arms of the rake to allow of its revolving.

In the accompanying drawings, in which like letters refer to corresponding parts in the several figures, A represents the supporting-frame, braced at its forward end by a cross-beam, $a$. Between the rear ends of the frame A is loosely mounted to revolve a rake, B, the ends of which project a slight distance beyond the sides of the frame A. The teeth $b$ of this rake are fitted in openings of the beam C, and are constructed of one piece. Near each end of the beam C, and at about the center of the same, is provided stop bars or rods D, each of which is somewhat longer than the teeth of the rake.

E represents a bar or tongue, which is seated in a recess of the bracing-beam $b$, its rear end being secured to a cross or tie beam, $d$. Upon this tongue E, a short distance from the beam $a$, is mounted a seat, F, which is preferably constructed of spring metal, as shown, and bent to form a U shape, by which construction all jolting and jarring of the driver is obviated.

F' represents a rod, which is mounted in the side of the tongue E at one end and in one of the sides of the frame A at its other end. Upon this bar F', at about the center of the same, is loosely mounted a lever, $e'$, which is held in place against lateral movement by means of two sleeves, $f$, mounted on said rod F', to bear against each side of the said lever and against the inner sides of the tongue E and frame A, respectively. Upon the opposite side of the frame A from which the end of the rod F has bearing, and near the rear end of the frame, is pivoted one end of a bar, $g$. The other end rests upon the opposite beam constituting the frame A, and the play or movement of said rod either forward or backward is limited by a bracket, G, secured upon the upper side of said beam. Upon the inner side of the bar $g$ is secured a rod, I, which is secured at its other end to the lever $e$, by which means the bar $g$ is operated.

In operation the lever $e'$ is pushed rearwardly, and, by means of the rod connection, the bar $g$ is pushed to the rear end of the bracket G, and in this position will prevent the revolution of the rake by engaging the central stop-arm, the stop-arms on the ends of the rake-beam being for the purpose of bracing the same and relieving the strain upon the central arm. When sufficient quantity of hay has been gathered, or, more properly, as much as the rake will hold, the lever is pulled forwardly, thus disengaging the bar $g$ from the stop-arm, which, in connection with the side arms, strikes upon the ground and dumps the load.

It will be seen from the above description that by the use of our device hay may be readily and effectually collected; that its operation is simple, yet thoroughly effective, and that it may be manufactured and supplied at a slight cost.

Having fully described our invention, what we claim as new, and desire to secure by Letters Patent, is—

1. The hay-rake described, comprising a supporting-frame, a rake journaled at the rear end thereof, stop-arms on said rake, a bar to engage one of said stop-arms, a bracket to limit the movement of the bar, a lever mounted on a bar at one side of the frame and adapted to move the locking-bar into and out of engagement with said stops, and sleeves on said bar to bear against each side of the lever, substantially as set forth.

2. The combination, with the frame, of a draft-tongue secured to the forward end thereof, a rod mounted between said draft-tongue and the side of the frame, a lever mounted on said rod, and sleeves on said rod bearing against each side of said lever to hold the same in place, substantially as set forth.

In testimony that we claim the foregoing as our own we have hereto affixed our signatures in the presence of two witnesses.

RUDY FRICK.
      OLIVER J. ROWE.

Witnesses:
 HENRY B. POFFENBARGER,
 L. D. LAMBERT.